United States Patent [19]

Kumandan

[11] 4,254,702
[45] Mar. 10, 1981

[54] DECLUSTERER DISC ASSEMBLY

[75] Inventor: Krishna R. Kumandan, Columbus, Wis.

[73] Assignee: Hughes Company, Inc., Columbus, Wis.

[21] Appl. No.: 103,119

[22] Filed: Dec. 13, 1979

[51] Int. Cl.³ ............................................ A23N 15/12
[52] U.S. Cl. ...................................... 99/638; 99/640; 130/30 R
[58] Field of Search .......................... 99/546, 635–644; 83/356.1, 356.2, 409.2, 411 R, 418; 366/222, 225, 226, 228, 229, 315, 316; 130/30 R

[56] References Cited

U.S. PATENT DOCUMENTS 3,405,750 10/1968 Weirauch ........................... 130/30 R Primary Examiner—Harvey C. Hornsby
Assistant Examiner—Timothy F. Simone
Attorney, Agent, or Firm—Isaksen, Lathrop, Esch, Hart & Clark

[57] ABSTRACT

A declusterer disc assembly (8) is disclosed which is useable in conjunction with a partition (20) of the pod tumbling drum (18) of a declusterer machine to shear the stems of pod vegetables which are engaged and elevated by notches (17) in the inner edge (16) of the partition (20) when the drum (18) is rotated. The declusterer disc assembly (8) includes a rotatable hub (12) and a pair of interchangeable discs (9a, 9b) mounted on the hub (12) in parallel relation to define a gap (14) between the discs (9a, 9b) of sufficient width to receive the partition (20) in slideable relation. The discs (9a, 9b) each have a plurality of spaced spokes (11a, 11b) extending from an annular cutting ring (10a, 10b) to the hub (12) to define spaced discharge openings (23) of greater area than the spokes (11a, 11b) for discharge of stem portions from between the discs (9a, 9b). The spokes (11a, 11b) engage the hub (12) in an offset manner and the discs (9a, 9b) are reverse oriented so that each spoke (11a, 11b) of each disc (9a, 9b), is axially aligned with a discharge opening (23) of the other disc and no substantial spoke (11a, 11b) surfaces are in axially opposed alignment.

7 Claims, 4 Drawing Figures

DECLUSTERER DISC ASSEMBLY

TECHNICAL FIELD

The present invention relates to machines for processing pod type vegetables and particularly to declustering machines designed to sub-divide clusters of pods prior to further processing.

BACKGROUND OF THE PRIOR ART

When pod vegetables such as green beans are commercially harvested by machines, the pods frequently remain in clusters of two or more pods still fastened together by stem sections, and also include single pods attached to undesirable stem sections. A necessary step in the processing of such vegetables is the subdivision of these clusters and the removal of excess stem sections so that individual pods may be further processed without waste or trash. Machines designed to subdivide such clusters are commonly referred to as declustering machines. Such a machine is described in Weirauch, U.S. Pat. No. 3,405,750.

The Weirauch machine is representative of a type of pod vegetable processing machine in which the vegetable is tumbled inside of a rotating drum. Such drums commonly comprise a multiplicity of cylindrical sections with slots penetrating their outer walls. The slots are adapted to allow the ends of pods to protrude as they tumble in the rotating drum. Knives sliding on the rotating exterior surface of the cylindrical sections cut off the protruding undesirable blossom and stem ends, a process generally known as "snipping." A multiplicity of such cylindrical sections are fastened end-to-end to form the drum. Partitions within the drum are adapted to maximize the likelihood that pods being processed in the drum will in fact come into contact with the outer cylindrical sections so that the ends of the pods may protrude through the slots for snipping. A passageway in each partition allows the vegetable pods being processed to migrate down the length of the rotating drum when one end of the drum is elevated.

The partitions in the Weirauch machine are further adapted to engage any clusters of pods present in the machine and thrust the stems of the clusters against rotating declusterer disc assemblies adjacent to the sides of the partitions, to subdivide the clusters. To accomplish this purpose the edges of the circular passages of the Weirauch partitions are serrated by a series of notches into which the stems of the clusters may drop and become engaged. Another partition for a Weirauch type declusterer machine is described in Kumandan, U.S. Pat. No. 4,131,062. The passages in the Kumandan partitions are in the form of straight sided geometric shapes (an octagon is preferred) with specially designed notches at the intersection of the primary edges of the passageways and specially designed intermediate notches recessed within each of the primary edges. The notches engage pod clusters by way of a "snagging" effect as the partition is rotated through the vegetable mass.

Both the Weirauch and Kumandan partitions are designed to allow clusters engaged in the partition notches to be efficiently presented to declusterer disc assemblies for subdivision. The declusterer disc assembly shown in the Weirauch patent consists of two annular discs attached in a parallel fashion directly to a hub consisting of an axial section of circular tubing. The gap between the discs is fixed so as to be only slightly wider than the thickness of the associated notched partition edge to cause the discs and the partition to cooperate in a cutting relationship. Cluster stems are snagged by the partition notches and drawn between the parallel inner surfaces of the discs to sever the stems and free individual beans from the cluster. A plurality of declusterer disc assemblies may be mounted in an axially spaced manner on a circular shaft to form a declusterer comb as shown in FIG. 4 of the Weirauch patent. The declusterer disc assemblies may be held in a fixed position relative to the rotating partitions or, preferably, be rotated in the same manner as the partitions.

An operating problem that has been experienced with declusterer discs in accordance with the Weirauch design is that residual stem material becomes packed into the gap between the discs during operation of the machine, thereby increasing interference with the associated partition, spreading the discs and damaging the machine. Cleaning the spaces is difficult and time consuming, because of limited access to the disc assemblies. As a result, the declustering efficiency of the machine is not optimized.

BRIEF SUMMARY OF THE INVENTION

The present invention is summarized in that an improved declusterer disc assembly for shearing stems of pod vegetable clusters engaged in notches along the inside periphery of an annular partition of a pod vegetable tumbling drum includes a central rotatable hub, a pair of coplanar discs mounted on the hub in substantially parallel spaced relation, each disc having an annular cutting ring at its outer periphery and a plurality of spaced spokes extending from the annular cutting ring and secured to the hub, the spokes defining discharge openings therebetween to permit stem portions drawn between the discs to be discharged therefrom, the discharge openings between the spokes extending from the hub to the annular cutting rings and being of greater planar area than the spokes, and the spokes being oriented on the hub so that each spoke of each disc is axially aligned with an opening of the other disc.

It is an object of the present invention to provide a self-cleaning declusterer disc assembly for shearing stems of pod vegetable clusters engaged along the inside periphery of an annular partition of a pod vegetable tumbling drum.

It is another object of the present invention to provide such a device employing interchangeable discs which when assembled present no closely spaced axially opposed unswept surfaces between which residual stem material might lodge during operation.

It is yet another object of the invention to provide such a device which is easily and economically constructed and assembled.

Other objects, advantages and features of the present invention will become apparent from the following specification taken in conjunction with the accompanying drawings.

DETAILED DESCRIPTION OF THE PREFERRED EMBODIMENT

Figure 1:
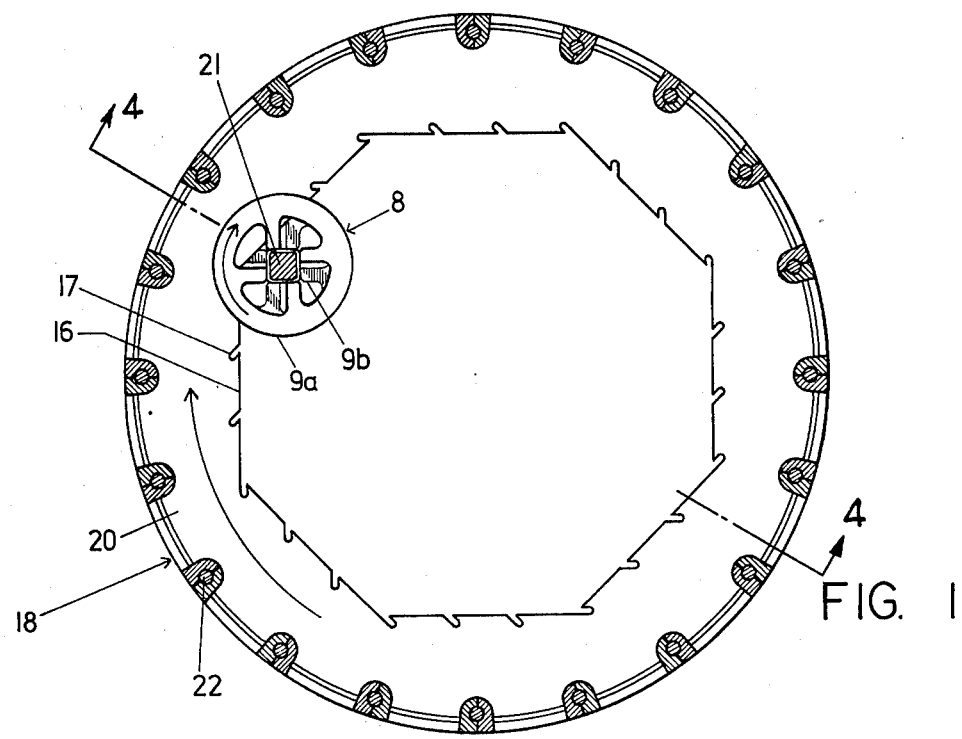
FIG. 1 is an axial cross-sectional view of a declustering apparatus pod-tumbling drum with my improved declusterer disc assembly mounted in rotatable overlapping relation with respect to a coplanar partition of the drum.
Figure 2:
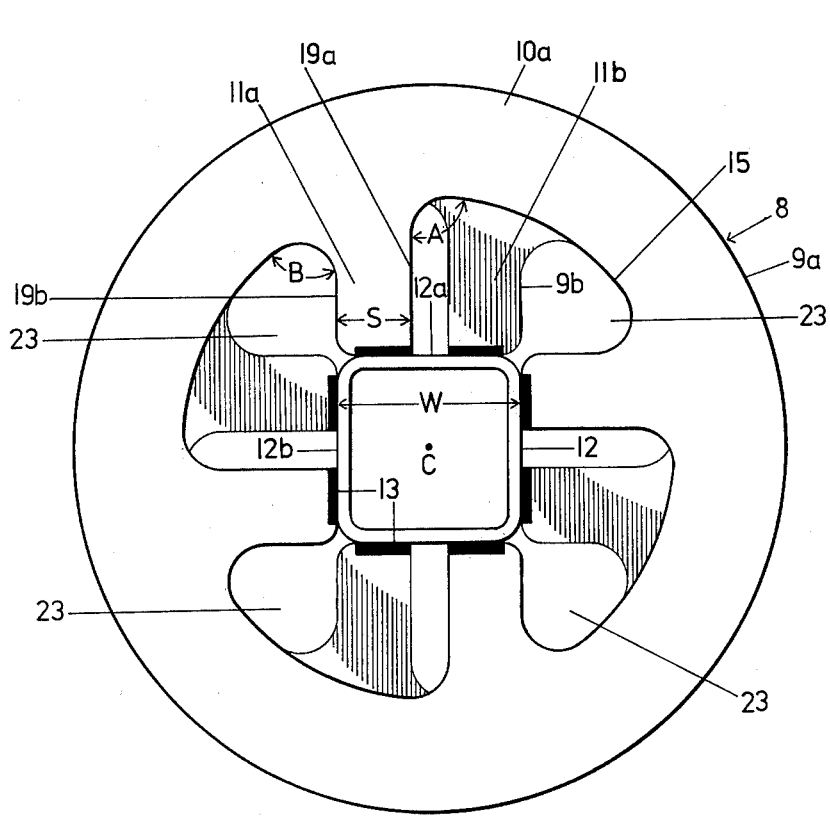
FIG. 2 is a end elevational view of my improved declusterer disc assembly showing the relationship of the disc spokes and the hub.
Figure 3:
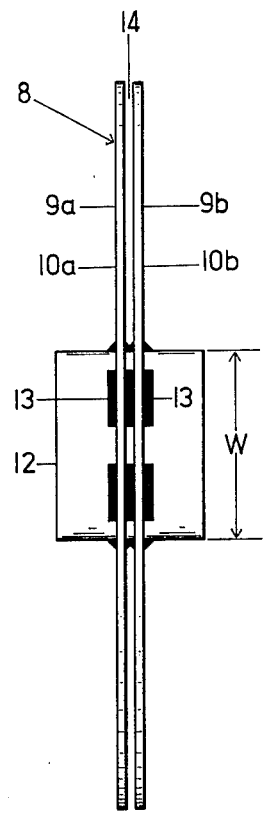
FIG. 3 is a side elevational view of my improved declusterer disc assembly showing the parallel relationship between the two discs.

Referring more particularly to the drawings, wherein like numbers refer to like parts, FIGS. 1–3 illustrate the preferred embodiment of my device for engaging and separating clusters of pod vegetables such as beans. In FIG. 1, my declusterer disc assembly 8 is shown in conjunction with a notched partition 20 mounted within a cylindrical pod tumbling drum 18 of a declustering machine of the type shown in Weirauch, U.S. Pat. No. 3,405,750. Preferably, my device is employed in conjunction with partitions 20 of the type illustrated in FIG. 1 and more fully described in Kumandan, U.S. Pat. No. 4,131,062. My declusterer disc assemblies may also obviously be employed in conjunction with partitions or discs of the type shown in Weirauch, U.S. Pat. No. 3,405,750, or of other suitable design.

The partitions 20 are normally employed in a cylindrical drum 18 of the type shown in FIG. 1 wherein the partitions extend transversely between adjacent cylindrical segments of the drum. The drum is held together in a conventional manner by tie-rods 22 extending the length of the drum and passing through the cylindrical segments and the holes (not shown) in the partitions 20. The partitions each have an inner, cluster engaging margin or edge 16 which is shown in FIG. 1 to be of generally octagonal shape. The edge 16 defines a passageway through the partition which allows vegetable pods being processed to travel axially through the drum. In addition to defining the central passage for pod vegetables through the partition, the edge 16 and notches 17 also comprise the inner, cluster engaging margin of the partition by means of which clusters of pod vegetables are engaged and removed from a mass of pod vegetables within the revolving drum and presented to the declusterer disc assembly 8 for shearing. The width of the notches 17 is less than the thickness of the pods themselves, so that the stems only are engaged and drawn through the declusterer disc assembly 8 to be severed from the pods. My unique declusterer disc assembly employs a novel structure and arrangement of parts which will now be described in more detail.

As shown in FIGS. 2 and 3, my declusterer disc assembly 8 includes a pair of identical coplanar discs 9a and 9b which are mounted in substantially parallel, closely spaced relation on a central hub 12. The two coplanar discs 9a and 9b are spaced apart on the hub 12 to define a gap 14 between the discs of sufficient width to receive a drum partition 20 in freely movable relation. Typically, such a partition will have a thickness of approximately ⅛ inch, and the gap 14 between the discs will have approximately the same width to cause the peripheral edges of the discs to pass closely adjacent to the sides of the partition when properly positioned and operated. Each disc 9a and 9b preferably has an annular cutting ring 10a and 10b, respectively, which forms the outer periphery of the disc and presents an exposed peripheral edge which cooperates with the notched edge 16 and adjacent surface of the partition 20 to shear the stem sections of pod clusters engaged in the notches 17 as the partition 20 is drawn through the gap 14 between the rotating discs 9a and 9b by rotation of the cylindrical drum 18.

Spaced spokes 11a and 11b extend inwardly from the annular cutting rings 10a and 10b of the discs 9a and 9b, respectively, to the hub 12 to which the spokes are fixedly attached, preferably by welds 13. The spokes 11a and 11b thus structurally support the annular ring sections 10a and 10b of the discs on the hub 12, and also define discharge openings 23 in the discs through which sheared stem sections carried between the discs 9a and 9b by the partition 20 will discharge from the gap 14 without lodging and building up between the discs. The discharge openings 23 are preferably of greater coplanar area than the spokes as described more fully below to maximize the opportunity for discharge of the stem sections.

The preferred embodiment of my disc assembly shown in the drawings employs a particularly advantageous spoke configuration which enables identical discs 9a and 9b to be oriented on the hub 12 in reversed relation whereby each spoke 11a of disc 9a is positioned axially opposite a discharge opening 23 of disc 9b, and each spoke 11b of disc 9b is positioned axially opposite a discharge opening 23 of disc 9a. Accordingly, no surfaces of my spaced discs 9a and 9b located inwardly of the annular cutting rings 10a and 10b are to be found in adjacent opposed position. In fact, it can be seen from FIG. 2 that the discharge openings are substantially larger than the areas of the spokes, and that each opening of each disc extends arcuately beyond the edges 19a and 19b of the spoke of the paired disc oriented opposite the opening. Thus, the planar areas of the spokes are minimized with arcuately spaced and staggered orientation, to minimize the opportunities for stem sections to lodge between the discs.

My unique spoke and discharge opening configuration is characterized by a non-radial spoke design wherein each spoke extends inwardly from the annular disc in an offset manner with respect to the hub 12. The construction of each spoke of each disc is substantially identical to each of the other spokes, and is best understood by reference to FIG. 2, wherein reference numerals have been applied to one spoke 11a only of disc 9a. The relationship between each spoke 11a and the annular cutting ring 10a and hub 12 can be clearly seen in FIG. 2, wherein the outwardly facing surface of disc 9a mounted on hub 12 is illustrated. It is seen from FIG. 2 that each spoke has a pair of edges 19a and 19b, which are preferably parallel, the edges being oriented at right angles to the adjacent face 12a of the hub 12 to which the spoke is attached. The longer edge 19a of each spoke 11a extends from the inner edge 15 of the annular cutting ring 10a to the adjacent face 12a of the hub 12 near, but offset outwardly from, the midpoint of the hub face 12a. The shorter edge 19b of the spoke 11a extends toward the hub and is preferably in approximate alignment with the plane of the next adjacent outer face 12b of the hub 12. The shorter edge 19b then curves to meet the hub face 12a in a tangential manner. Likewise, the intersections of edges 19a and 15 at angle A and edges 19b and 15 at angle B are smoothly curved to avoid any sharp corners which might snag and retain stem material and trash. It is seen that the width S of the spoke is less than one-half the width W of the hub 12. Accordingly, when each pair of discs is attached to the hub 12 as shown, the spokes 11b of the rear disc 9b will be positioned in offset relationship to the spokes 11a of the front disc 9a so that none of the rear spokes 11b will be axially opposed to any of the forward spokes 11a. Offsetting the spokes in this manner ensures that there are no opposed surfaces in the area between the hub faces and the inner edge 15 of the annular cutting rings 10a and 10b.

The offset relationship of the spokes 11a and 11b as described above has two important advantages. First, there are no closely spaced, opposed spoke surfaces between which residual stem material and trash might lodge. Because the area of the discharge openings 23 is substantially greater than the area of the spokes, the offset spokes 11a and 11b are further seen to be transversely spaced to further reduce the possibility of material lodging between the spokes.

A second significant advantage of applicant's offset spoke design is that both sides of each spoke are clearly accessable for welding to the hub 12. Thus, it is seen that the welds 13 are easily made on both sides of each spoke in a simple and efficient manner to produce a very stable construction with minimal labor costs. The interchangeability of the discs also contributes to low manufacturing costs, since every disc is identical and can be used for either side of each disc pair.

In use, the hub 12 is mounted on square shaft 21 within drum 18 with discs 9a and 9b positioned on either side of partition 20, as shown in FIG. 1. The shaft 21 is preferably positioned so that the partition 20 will physically sweep and clear the area between opposed annular cutting rings 10a and 10b. Because the inner edge 16 of partition 20 is octagonal in shape, its radial distance from the center of the drum varies, and the depth of penetration of the partition within the gap 14 between discs 9a and 9b will also vary as the drum and the partition rotate. Accordingly, the outside limits for the position of shaft 21 will be the innermost position at which the portion of inner edge 16 of greatest radial distance from the center of the drum will pass between the cutting discs 9a and 9b, and the outermost position at which the point on inner edge 16 of shortest radial distance to the center of the drum will clear the portions of the hub 12 of greatest radial distance from hub center C.

As the partition 20 passes between the annular cutting rings 10a and 10b of the discs 9a and 9b in slideable relation, stems and other debris will from time to time be forced by the partition inner edge 16 toward the hub 12 of the disc assembly 8. With the solid discs of the prior art, a gradual build-up of residual stem material could occur around the hub and between the discs. Such stems and debris could then cause damage to the solid discs by forcing them apart and thereby lessening their shearing efficiency, or damage to the partition by interferring with its travel through the disc assembly, or both. With my improved disc design wherein the annular cutting rings 10a and 10b are connected to the hub 12 by offset spokes, the stems and debris forced toward the hub by the partition 20 will pass outwardly from between the discs through the discharge openings 23 and thus avoid harmful build-up of material. No area between the discs 9a and 9b which is not physically cleared by passage of the partition 20 will have axially opposed surfaces between which any stems or debris may become lodged during operation. Accordingly, my improved disc assembly with offset spokes and discharge openings is substantially self-cleaning, resulting in greatly reduced down time of the machine for cleanup and repair, and making clean-up of the disc assembly at regularly scheduled machine clean-up times much quicker and easier. Accordingly, a major cause of clogging, potential damage, and required service for declustering machines of the Weirauch type is eliminated by my improved declusterer disc assembly.

Figure 4:
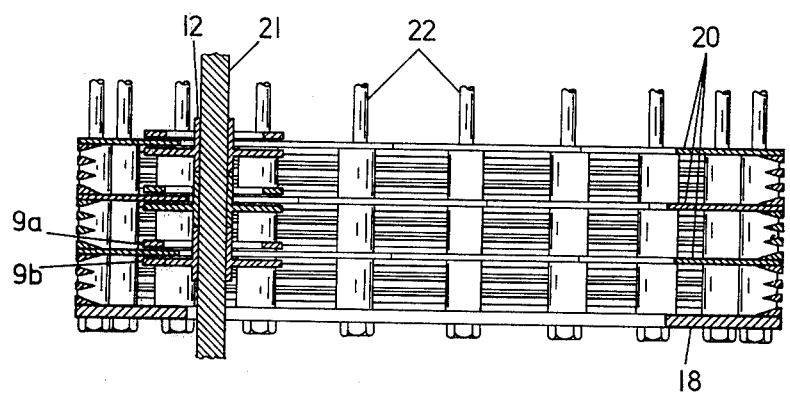
FIG. 4 is a partial cross-sectional view taken along section line 4—4 of FIG. 1.

A plurality of declusterer disc assemblies may be axially spaced on the square shaft 21, and the resultant comb positioned within the rotating drum as shown in Weirauch, U.S. Pat. No. 3,405,750, FIG. 4. The comb may be held fixed, with the pairs of annular rings flanking a plurality of revolving partitions or the comb may be rotated by usual means to revolve in the same direction as the rotating partition, i.e., clockwise as in FIG. 1.

While the discs 9a and 9b which have been illustrated and described herein are shown to have annular cutting rings 10a and 10b with substantially circular outside and inside margins or edges, it should be clear that the outer margin of the discs and cutting rings may be of non-circular shape as, for example, serrated, without departing from the specification and claims. Likewise, the inner edge 15 of the annular discs between the spokes need not be circular but may be of any shape which provides for a discharge opening 23 of substantial size between adjacent spokes. Although a substantially square hub 12 and 4-spoke design for each disc is preferred, a hub having a different number of planar faces may be used with discs having different numbers of spokes, or a circular hub could be used with offset spokes extended to the periphery of the hub in non-opposed manner.

It is understood that my invention is not confined to the particular construction and arrangement of parts herein illustrated and described but embraces all such modified forms thereof as come within the scope of the following claims.

I claim:

1. In a declustering apparatus for subdividing clusters of vegetable pods with stem connections, having a rotatable pod tumbling drum (18) with at least one axially spaced coplanar partition (20) having a central passage defined by an edge (16) and notches (17) spaced along the edge for engaging and elevating the stems of the pods, an improved declusterer disc assembly (8) for shearing the stems engaged by the partition notches (17) comprising:
   a. a central hub (12) supported in rotatable relation and spaced from the edge (16) of the partition (20),
   b. a pair of coplanar discs (9a, 9b) mounted on the hub (12) in substantially parallel spaced relation to define a gap (14) therebetween of sufficient width to receive a partition (20) in slidable relation,
   c. each disc (9a, 9b) having an annular cutting ring (10a, 10b) for overlapping the edge (16) of the rotatable partition (20) in close axial relation to shear stem portions engaged in the partition notches (17) and presented to the outer circumference of the annular cutting ring (10a, 10b) as the rotating partition passes between the discs (9a, 9b), and
   d. each disc (9a, 9b) having a plurality of spaced spokes (11a, 11b) extending from the annular cutting ring (10a, 10b) and secured to the hub (12) to define a plurality of spaced discharge openings (23) between the spokes (11a, 11b) and of greater planar area than the spokes (11a, 11b) to permit sheared stem portions drawn between the discs (9a, 9b) by the partition (20) to be discharged therefrom, the spokes (11a, 11b) of each disc (9a, 9b) being oriented on the hub (12) so that each spoke (11a, 11b) is axially aligned with a discharge opening (23) of the other disc (9a, 9b) and no substantial spoke (11a, 11b) surfaces are in axially opposed alignment.

2. The apparatus specified in claim 1 wherein the annular cutting rings (10a, 10b) of the discs (9a, 9b) are located at the peripheries of the discs (9a, 9b), and wherein the disc assembly (8) is positioned within the drum (18) such that at least one portion of the rotatable partition (20) will pass between all areas of the opposed surfaces of the annular cutting rings (10a, 10b) during rotation of the drum (18).

3. The apparatus specified in claim 1 wherein the discs (9a, 9b) are substantially identical and interchangeable, and are mounted on the hub (12) in reversed orientation to provide for the axial alignment of each spoke (11a, 11b) of each disc (9a, 9b) with an opening (23) of the other disc (9a, 9b).

4. The apparatus specified in claim 1 wherein the hub (12) has a generally square outer periphery with four external faces (12a, 12b), and wherein a single spoke (11a, 11b) of each disc (9a, 9b) is secured to each face (12a, 12b) of the hub (12).

5. An improved declusterer disc assembly (8) for shearing stems of pod vegetable clusters engaged in notches (17) along the inner edge (16) of an annular partition (20) of a pod vegetable tumbling drum (18), comprising:
   a. a central hub (12) adapted for rotatable mounting in spaced relation to the inner edge (16) of the partition (20),
   b. a pair of coplanar discs (9a, 9b) mounted on the hub (12) in substantially parallel spaced relation to define a gap (14) therebetween of sufficient width to receive the partition (20),
   c. each disc (9a, 9b) having an annular cutting ring (10a, 10b) at its outer periphery and a plurality of spaced spokes (11a, 11b) extending from the annular cutting ring (10a, 10b) and secured to the hub (12), the spokes (11a, 11b) defining discharge openings (23) therebetween to permit stem portions drawn between the discs by the partition (20) (9a, 9b) to be discharged therefrom, the discharge openings (23) between the spokes (11a, 11b) extending from the hub (12) to the annular cutting rings (10a, 10b) and being of greater planar area than the spokes (11a, 11b), and the spokes (11a, 11b) being oriented on the hub (12) so that each spoke (11a, 11b) of each disc (9a, 9b) is axially aligned with an opening (23) of the other disc (9a, 9b).

6. The apparatus specified in claim 5 wherein the discs (9a, 9b) are substantially identical and interchangeable, and are mounted on the hub (12) in reversed orientation to provide for the axial alignment of each spoke (11a, 11b) of each disc (9a, 9b) with an opening (23) of the other disc (9a, 9b).

7. The apparatus specified in claim 5 wherein the outer periphery of the hub (12) has a plurality of external faces (12a, 12b), and wherein a single spoke (11a, 11b) of each disc (9a, 9b) is secured to each face (12a, 12b) of the hub (12).

* * * * *